United States Patent [19]

von Nordenskjold

[11] 3,747,224

[45] July 24, 1973

[54] PROCESS FOR DRYING RAW AGRICULTURAL PRODUCTS, PARTICULARLY POTATOES

[75] Inventor: Reinhard von Nordenskjold, 3406 Bovenden, Germany

[73] Assignee: Firma Georg Dietzel, Deisenhofen, Germany

[22] Filed: Apr. 26, 1971

[21] Appl. No.: 137,591

[30] Foreign Application Priority Data
Apr. 24, 1970 Germany............... P 20 20 074.2

[52] U.S. Cl. .................................... 34/12, 99/207
[51] Int. Cl. ............................................. F26b 7/00
[58] Field of Search ............... 34/12, 108; 146/47; 99/207

[56] References Cited
UNITED STATES PATENTS

| | | | |
|---|---|---|---|
| 648,248 | 4/1900 | Edwards | 34/12 X |
| 3,058,234 | 10/1962 | Stone | 99/207 X |
| 3,016,936 | 1/1962 | Wilson et al. | 146/47 |
| 77,995 | 5/1968 | Marshall | 99/207 |
| 345,159 | 7/1886 | Maull | 99/207 |
| 727,585 | 5/1903 | Bunyan | 99/207 |
| 1,025,374 | 5/1912 | Cooke | 34/15 X |
| 2,102,607 | 12/1937 | Baker | 34/12 X |
| 1,977,644 | 10/1934 | Paxton | 34/12 X |
| 2,676,632 | 4/1954 | Hook et al. | 146/47 |

*Primary Examiner*—William F. O'Dea
*Assistant Examiner*—William C. Anderson
*Attorney*—Woodhams, Blanchard & Flynn

[57] ABSTRACT

A process for drying raw agricultural products for feed purposes. The raw product is first pulped into a raw and wet pulped product which is thereafter moved into a pulp box for distribution onto a roller drier. The product is heated while in the pulp box, and then distributed onto the roller drier and dried while in contact therewith. The dried product is then removed from the roller drier and is thereafter broken into flakes.

11 Claims, No Drawings

PROCESS FOR DRYING RAW AGRICULTURAL PRODUCTS, PARTICULARLY POTATOES

In Germany, most eastern European countries and in the case of our northern neighbors, almost all harvested grain and seed must be dried artificially if a storable product is to be obtained. However, of greater importance is the artificial drying of products with a high water content, like green goods of any type, root crops, beet greens and beet greens plus beet and, to a small extent, also corn.

Even though artificial drying experienced an enormous upswing in our neighboring countries after the war, in the Federal Republic of Germany corresponding efforts with respect to the artificial drying of green goods has so far been unsuccessful because of our agricultural structure the drying of potatoes, which had been widespread already earlier in the East German areas, took again a considerable upswing. However, the formerly common drying on roller driers with the final product being of a "flake" form is hardly used anymore, but drying in directly heated drum driers with the final product being in a granular form, such as "coarse-ground corn" or kernels, is used.

The following factors were mainly decisive for this change of the processes:

1. The flake-producing systems with roller driers which work very carefully, particularly compared with the hot-air drying, remain at a stage of development which, however, is no longer satisfactory today both with respect to the required capital investment expenses and also with respect to the current production expenses. Particularly the high portion of labor cost in the total drying expenses in the present process for drying of potatoes on roller driers must be considered to be disadvantageous. Furthermore, this process does deliver usable, however, not completely satisfactory, final products because in the case of the steaming which is required in the present process, the potatoes are exposed to higher temperatures for a longer priod of time than is desired and thorugh this, temperature-sensitive substances, for example, vitamins, are destroyed. Finally the steaming of the potatoes required by this known process causes undesired material losses and a high energy output.

From the above and also from the fact that the wet preservation due to its waste and unfavorable characteristics of its final product — poor durability, no trade goods, feedable only by many hands and hardly feedable by means of automatic machines, etc. — no longer meets the requirements of today, it results that a considerable need exists for a drying process which, on one hand, works just as carefully as, or even more carefully than, the known indirect contact drying method which operates with roller driers and, on the other hand, with respect to the expenses and the losses occurring during the drying is just as favorable as, or more favorable than, the presently commonly used drying process by drying in directly heated drum driers.

Therefore, it is the purpose of the invention to produce such a process for drying agricultural products which have a high content of water, in particular potatoes.

This purpose is attained by a process for drying agricultural products, particularly potatoes for animal feed purposes, by drying the crushed agricultural product on roller driers, which product, if necessary, is free from shells or skins, which process is characterized in that the product to be dried is crushed substantially raw and the raw, crushed product is then dried in the conventional manner on the roller driers.

Compared with the known method for drying agricultural products and in particular potatoes on roller driers, the process of the invention has a series of process-technical advantages of which the following must be named in particular:

1. A considerable simplification of the entire structure of the entire system since various operations are no longer required, for example, the treatment in the so-called steamer.

2. The crushing, for example, by means of crushers and pulpers which, compared with the known processes in which the goods must be shredded, are sturdy.

3. The combining of the required heat treatment and the evaporating process into one single operation which takes place in only one apparatus (roller drier).

4. By deleting the steamer, of course, the waste water problems and losses of energy and material are also nonexistent.

5. Aside from a small amount of dust in the vapor hood, no material losses occur in the entire system so that this process indeed works "without any loss."

6. The energy output for the condensate flowing out from the steamer needed so far, is no longer required.

7. Due to the structure of the material layer on the drying rollers which structure, compared with the common flake production, has been changed advantageously, a certain output increase is obtained which more than balances the small output reduction caused by the application of the cold crushed pulp onto the drier.

8. The installed system requires, with the today common construction which is flush with the ground, only an area which is considerably smaller than the area required for a comparable hot-air drying system.

9. When the only source of noise, the pulper or crusher, is sunk, the process operates very quietly. Since at the same time, hardly any dust accumulates, an excellent working climate is created as can be expected in a modern system.

From the above simplifications of the process of the invention there result considerable savings with respect to the investment for both the machines and also in particular the building structures and also the operating expenses, as has already been mentioned, can be lowered considerably so that these drying expenses are all together even slightly below the expenses for the drum hot-air drying.

However, it is of particular importance that the treatment of the goods to be dried is, in the case of the process of the invention, considerably more careful than in the case of the drum hot-air drying and that the goods are treated more carefully than in the case of the known process for the manufacture of potato flakes, which process is already rather satisfactory with reference thereto, since the goods during the process is exposed to high temperatures for a shorter period of time and, based on the clearly defined thermodynamic relationships on the roller drier, local overheatings can also be avoided.

The process of the invention is particularly suitable for the drying of potatoes which are first thoroughly washed and then are converted to pulp (or crushed). The raw (uncooked) pulp can be pumped well with the help of a Mohno-pump in contrast to the puree from steamed potatoes. It is advisable to arrange, as a storage zone, a pulp box in front of the pump and thus also in front of the drier in order to assure an even and continuous processing. In order to assure a higher drying output and an even loading of the drying roller, it can be advantageous to design the pulp box of the drier which acts also as a storage zone in such a manner that the pulp contained in it is already heated up to cooking temperature. The potato puree or rather the pulp from the pulp box is, as usual, applied to the rollers whereby, however, the skin residues advantageously also move along into the mist or vapor phase.

The final product, which can easily be removed by knives, forms in most cases, not large flakes, but rather granules or kernels like coarse-ground corn. The apparent bulk density is higher than apparent bulk density of common potato flakes, which is approximately 0.25 kg./1 tr.; however, it is not as high as the apparent bulk density of potato chips, which is approximately 0.6 kg./1 tr. If at the drying of potatoes according to the process of the invention, the potatoes are not peeled, a gray-colored material is obtained, the coloring of which is probably partly due to the amount of potato peels and partly due also to discolorations which occur during the process; the latter can be avoided to a great extent by means of a suitable machine and process structure. These are partly oxidizing processes which are speeded up catalytically by contact with steel, for which reason the pulper including the knives used for the process should be made of fine alloy steel. The gray coloring can furthermore be minimized by adding common stabilizers, like monoglycerides, sodium sulphite, milk powder, etc. to the pulp.

Furthermore a lighter final product can be obtained by peeling the potatoes prior to cutting, crushing or pulping same, for example, by slightly steaming them in a steampeeling automatic machine so that the peels can be removed easily and by removing the peels completely by means of a subsequent rewashing and, if necessary, a further washing. In this manner, but also corresponding to the above description, products for human nourishment can be produced easily by the process, since the drier works indirectly.

As was found out through experiments, beets and green goods can also be dried by the process of the invention whereby, however, a preparation is required so that an incident-free and perfect application on the drying rollers and a high drying output is achieved.

Referring to the drying of potatoes according to the process of the invention it must further be pointed out that, as has been proven by experiments, a surprisingly good solubility and a high degree of agglutination can be achieved and a non-dusting (or powdery) product is obtained.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A process for drying raw agricultural products for feed purposes, the steps comprising:
    pulping the raw product into a raw and wet pulped product;
    moving the raw and wet pulped product into a pulp box for distributing the raw pulped product onto a roller drier;
    heating the raw pulped product while in said pulp box;
    distributing the heated product onto said roller drier and dried while in contact therewith;
    removing said dried product from said roller drier; and
    breaking said dried product into flakes.

2. A process according to claim 1, including the step of peeling the raw product before it is pulped.

3. A process according to claim 2, including the step of crushing said raw product prior to its being pulped.

4. A process according to claim 3, wherein said heated product is dried on said roller drier by a contact process.

5. A process according to claim 4, wherein said dried product is removed from said roller drier by a scraping knife.

6. A process according to claim 1, wherein said product is heated in said pulp box up to a cooking temperature but said product is not cooked therein.

7. A process according to claim 6, wherein said heated product is evenly distributed in a layer on said roller drier.

8. A process according to claim 1, including the steps of prewashing said product and thereafter steaming said product prior to said pulping step to improve the releasability of the skin from said product.

9. A process according to claim 8, including the step of peeling said product after said steaming thereof.

10. A process according to claim 1, wherein said raw pulped product is moved to said pulp box by a pumping process.

11. A process according to claim 1, wherein said agricultural product is potatoes.

* * * * *